United States Patent [19]
Mason

[11] 3,857,533
[45] Dec. 31, 1974

[54] HELICOPTER SELF-LEVELING LANDING GEAR

[76] Inventor: Samuel H. Mason, 603 Virginia Ter., Santa Paula, Calif. 93060

[22] Filed: Jan. 28, 1974

[21] Appl. No.: 437,347

[52] U.S. Cl............ 244/17.17, 180/41, 280/6 R, 244/100 R, 244/103 R
[51] Int. Cl............................................ B64c 25/32
[58] Field of Search ..... 180/41; 280/6 R, 6 H, 6.11; 244/17.17, 17.11, 100 R, 102 R, 103 R

[56] References Cited
UNITED STATES PATENTS

| | | | |
|---|---|---|---|
| 237,927 | 2/1881 | Taynton et al................... | 280/6 R |
| 1,716,233 | 6/1929 | Larsh............................... | 280/6.11 |
| 3,173,632 | 3/1965 | Woods............................ | 244/17.17 X |

FOREIGN PATENTS OR APPLICATIONS

| 118,333 | 3/1947 | Sweden........................ | 244/17.17 |

Primary Examiner—Trygve M. Blix
Assistant Examiner—Paul E. Sauberer
Attorney, Agent, or Firm—Pastoriza & Kelly

[57] ABSTRACT

A self-leveling landing gear for a helicopter includes two curved track members lying in parallel planes generally normal to the longitudinal axis of the helicopter. Skids are secured to the opposite downwardly extending curved ends of the curved track members. A base frame for the helicopter receives the curved track members in guide means so that the track members may move through the base member of the helicopter and thus the helicopter can remain in a level position even though one landing skid is at a higher level that the other when the helicopter lands on uneven terrain. The curved track members can be locked to the base frame of the helicopter when the helicopter is in a level position so that it will be stably supported on the uneven terrain.

10 Claims, 4 Drawing Figures

PATENTED DEC 31 1974 3,857,533

HELICOPTER SELF-LEVELING LANDING GEAR

This invention relates generally to helicopters and more particularly to an improved helicopter with a self-leveling landing gear so that the helicopter can remain level even though it lands on a slope or other type of uneven terrain.

BACKGROUND OF THE INVENTION

Conventional helicopters usually include landing gear in the form of a pair of parallel skids secured by suitable struts to the base frame of the helicopter. In the absence of any type of individual level control for the respective skids, the helicopter is limited to landing in relatively flat areas as otherwise the helicopter may tip over after landing.

Many systems have been proposed for providing landing gear structures which can support a helicopter in a level position on uneven terrain or slopes. An example of one system is simply a mechanical crank means operable by the pilot of the helicopter which will lower one skid to a level below the other to accommodate a sloping terrain. While this system is simple and inexpensive, the pilot must judge the slope of the terrain to effect the proper mechanical adjustment and the cranking of the skids can be a difficult operation when simultaneously attempting to land the helicopter.

Other proposed systems incorporate hydraulic jacks to vary the level of one skid with respect to the other. These more sophisticated versions are necessarily more expensive and require more equipment thereby adding to the overall weight of the helicopter. Further, many such landing gear leveling systems operate in a manner such that after landing the weight of the helicopter is predominantly on one skid so that it is still vulnerable to tipping over even though the body is level.

BRIEF DESCRIPTION OF THE PRESENT INVENTION

Bearing the foregoing in mind, the present invention contemplates an improved self-leveling helicopter landing gear permitting landing of the helicopter on uneven terrain wherein many of the problems associated with prior self-leveling systems are avoided.

More particularly, the invention contemplates the provision of curved track members lying in parallel planes normal to the longitudinal axis of the helicopter and passing through a base frame of the helicopter. This base frame incorporates guide means so that movement of the curved tracks through the guide means varies the distance of their opposite ends from the ground. First and second skids are secured to the opposite ends running parallel to and on either side of the longitudinal axis of the helicopter. A locking means is provided for locking the position of the curved tracks in the base frame after landing of the helicopter on uneven terrain. With the curved tracks free to move through the guide means in the base frame, a pilot in landing the helicopter will simply maintain the helicopter level, the far ends of the curved tracks and skids adjusting to the level of the terrain. The pilot then actuates the locking means or, alternatively, the locking means can be automatically actuated by operation of the helicopter pitch control or in response to the weight of the helicopter on the skids to thus maintain the helicopter body level upon completion of the landing.

In effect, a self-leveling automatically takes place upon landing of the helicopter and then subsequent locking of the curved tracks assures that the helicopter will remain in a level, stable position on the ground.

The foregoing arrangement is relatively inexpensive, does not require any appreciable amount of added equipment which would add to the weight of the helicopter, and is operable with a minimum of requirements on the pilot of the helicopter. Moreover, the helicopter weight is evenly distributed.

BRIEF DESCRIPTION OF THE DRAWINGS

A better understanding of the invention will be had by now referring to preferred embodiments thereof as illustrated in the accompanying drawings in which.

DETAILED DESCRIPTION OF THE INVENTION

Figure 1:
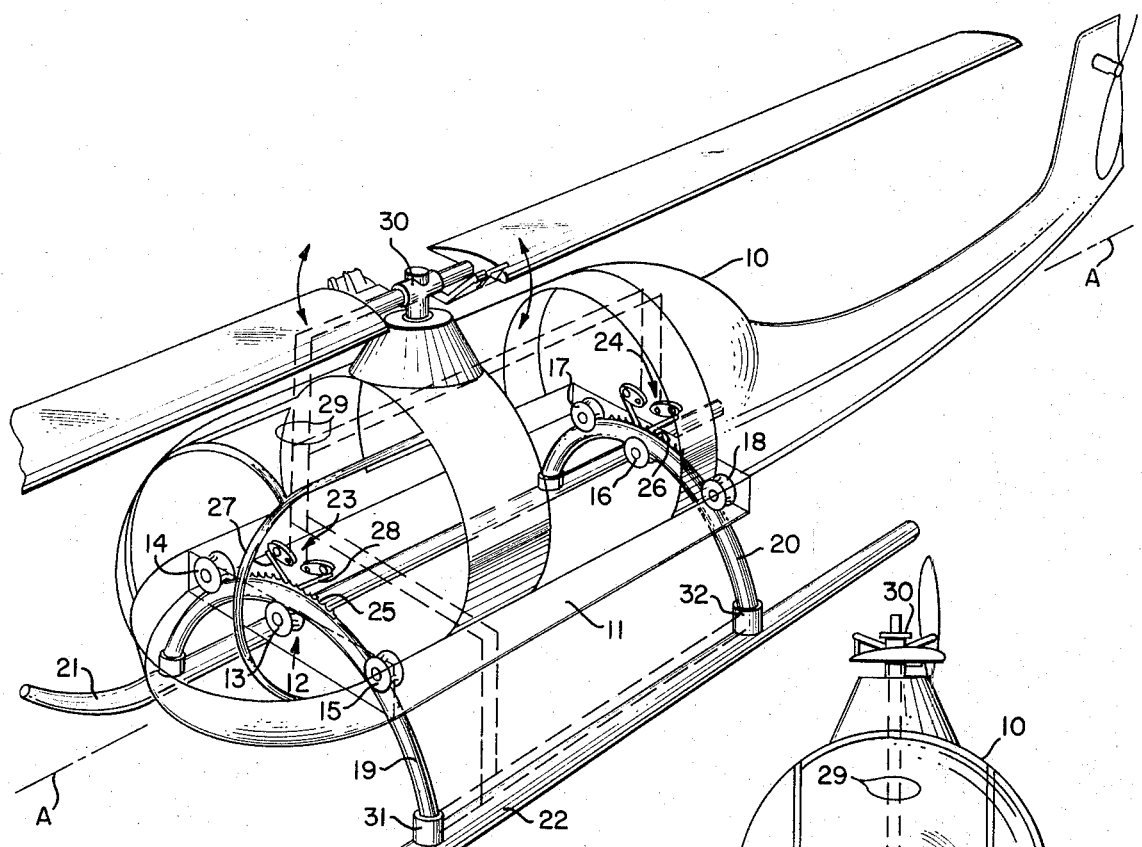
FIG. 1 is a perspective view of a helicopter incorporating the self-leveling landing gear of the present invention.

Referring first to FIG. 1 there is shown a helicopter 10 having a base frame 11 incorporating suitable guide means designated generally by the numeral 12. The guide means may take the form of an arcuate passage incorporating a central under-roller 13 and outer upper side rollers 14 and 15. The rear portion of the base frame 11 similarly includes a guide means having a central roller 16 and outer upper rollers 17 and 18.

These guide means are arranged to receive first and second curved track members 19 and 20. The track members, which are preferably semi-circular in shape, lie in parallel planes generally normal to the longitudinal axis A—A of the helicopter and are arranged to be guided in movement by the rollers such that the distance of their opposite ends from the ground will vary depending upon the arcuate position of the curved tracks relative to the base frame 11.

As shown, the opposite downwardly extending ends of the curved tracks are secured to first and second skids 21 and 22 which extend generally parallel to and on either side of the longitudinal axis A—A.

In order to lock the curved track members to the base frame when in a desired position, there are provided first and second locking means designated generally by the numerals 23 and 24 associated with the first and second curved tracks 19 and 20. The locking means 23 and 24 are coupled together for simultaneous operation and serve to lock the first and second tracks to the base frame when actuated. Essentially, the locking means incorporates first and second curved racks 25 and 26 secured to the central portions of the curved tracks 19 and 20. The remaining portions of the locking means are identical for the front and rear curved tracks; therefore a detailed description of one will suffice for both.

Thus referring to the locking means 23 there are provided finger means in the form of first and second fingers 27 and 28 arranged to engage in the rack notches of the rack 25 to thus lock the track member to the base frame. As indicated schematically by the dashed lines 29, an inner coupling means may be provided between these fingers and the pitch control 30 for the helicopter. Normally, there is a collective lever control in the cockpit of the helicopter to one side of the pilot which may be mechanically coupled to the fingers and which lever control actuates the pitch control 30 to vary the pitch of the helicopter blades as indicated by the double headed arrows. The automatic arrangement would be such that the fingers 27 and 28 engage the rack 25 to lock the track member in a set position only when a given pitch angle of the blades is effected.

An alternative type of automatic control for the locking means may take the form of hydraulic piston and cylinder arrangements indicated at 31 and 32 by way of example between the opposite ends of the curved tracks and the skids. The arrangement is such that when a given weight is applied to the skids, the hydraulic cylinder and pistons will be actuated to operate the locking means and in the absence of weight on the skids, the locking means will be released.

Figure 2:
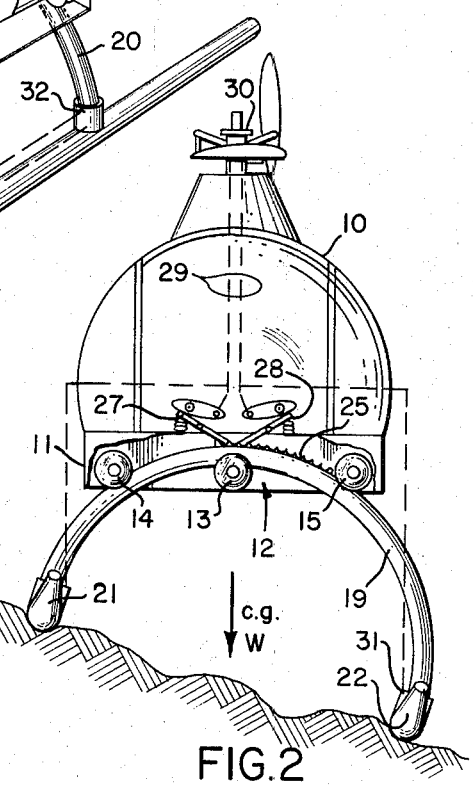
FIG. 2 is a front, elevational view of the helicopter of FIG. 1, supported by the landing gear on uneven terrain.

Referring to FIG. 2, the level position of the helicopter 10 is illustrated when the skids 21 and 22 engage uneven terrain. Because of the semicircular shape of the curved tracks, the weight of the helicopter indicated by the letter W in FIG. 2 will be divided equally between the skids 21 and 22. This feature is important for stability of the helicopter when on uneven terrain. For example, if the helicopter body pivoted about a single shaft passing through the mid points of the curved tracks to assume a level position, its weight or center of gravity would be largely supported by the lower of the two skids. With the present arrangement, wherein the helicopter frame and body essentially traverse along the curved track, the weight of the helicopter is divided equally between the skids regardless of the relative level of one skid to the other.

Figure 3:
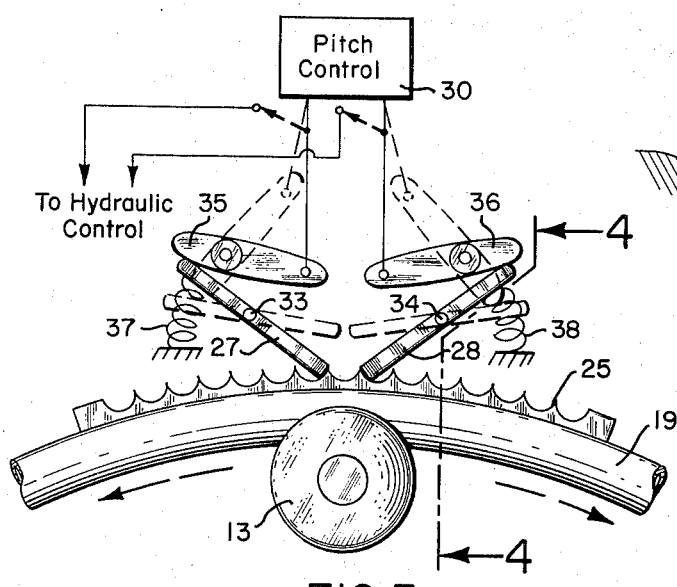
FIG. 3 is an enlarged fragmentary view partly schematic in nature illustrating the locking means for the landing gear; and, FIG. 4 is a fragmentary, cross section taken in the direction of the arrows 4—4 of FIG. 3.

FIG. 3 illustrates in further detail the locking finger arrangement for the curved track 19 with cooperating curved rack 25. As shown, the fingers 27 and 28 are centrally pivoted to the base frame as at 33 and 34. The other ends of these fingers are arranged to be cammed by camming members 35 and 36 in turn coupled to either the pitch control or to the hydraulic control described with respect to FIG. 1. Springs 37 and 38 are schematically illustrated and function to bias the fingers into engaging position with the rack 25.

Figure 4:
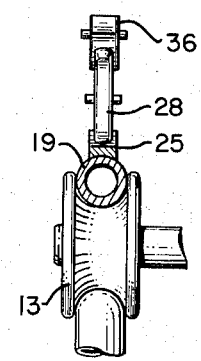

The detail of FIG. 4 illustrates a preferred type of guide means wherein the roller is in the form of a pulley which adequately nestles the curved track 19, the latter being of a tubular construction.

OPERATION

In operation, the locking means will be biased to the dotted line position illustrated in FIG. 3 so that the fingers 27 and 28 are free of engagement with the rack 25 and each of the curved track members 19 and 20 of FIG. 1 are free to be smoothly guided through the base frame 11. This condition would obtain when the pilot is contemplating a landing. Otherwise, the locking fingers would normally hold the skids in a locked position to the helicopter base frame.

With the curved track members free to move in the base frame 11, as the pilot lands for example on uneven terrain the skids 21 and 22 will adjust themselves to engage the uneven terrain while the pilot holds the body 10 of the helicopter in a level position. As the pitch control is adjusted to permit the weight of the helicopter to fully fall on the skids, the locking means will be automatically actuated either by the collective pitch lever or by the hydraulic control as described to lock the curved tracks in their assumed positions.

While the helicopter is on the ground, it will thus be maintained in a level, stable position.

When the pilot decides to take off, he will adjust the blade pitch in the usual manner and simply lift off from the uneven terrain. As the weight of the helicopter is removed from the skids, if the hydraulic system is utilized to control the locking means, the curved track members 19 and 20 will be released so that they can be reoriented to a position in which the skids are level relative to the base frame 11. This same automatic releasing of the locking means can be effected by the adjusted pitch during take-off, as mentioned heretofore. After the curved track members have been properly centered, the locking mechanism may be relocked manually if desired simply in order to prevent inadvertent movement of the curved tracks through the base member when in flight.

From the foregoing description, it will thus be evident that a very simple and sturdy mechanism has been provided to function as a self-leveling landing gear for a helicopter. Not only is the mechanism simple to operate, thus requiring a minimum of the pilot's attention, but in addition, the important feature of even weight distribution when resting on uneven terrain is assured. Moreover, there is required a minimum of additional equipment as opposed to a conventional landing gear so that the overall weight of the helicopter is not appreciably increased nor is the provision of the self-leveling feature exorbitantly expensive. With inter-coupling means to either the pitch control collective lever or suitable hydraulic means between the ends of the curved tracks and the skids, a minimum of the pilot's attention is required in operating the system.

What is claimed is:

1. A helicopter self-leveling landing gear including:
   a. a helicopter having a lower base frame;
   b. guide means on said base frame;
   c. at least one curved track member of inverted U-shape having a central portion passing through said guide means and its opposite end portions curving downwardly from the central portion toward the ground, the track member lying in a plane normal to the longitudinal axis of the helicopter and being movable through the guide means to thereby vary the distance between each end and the ground;
   d. landing skids extending generally parallel to the longitudinal axis of the helicopter secured respectively to the ends of the track member; and,
   e. locking means on the base frame coupled to the central portion of said track member for locking the track member to the base frame in an immovable position, whereby the level of one landing skid relative to the other may vary by movement of the track member through the guide means such that said base frame and helicopter may be maintained at a level position when said landing skids engage uneven terrain during landing wherein one landing skid is at a higher level than the other, and said locking means actuated to lock the track member and thus the skids relative to the base frame after landing to maintain the base frame and helicopter level.

2. A helicopter according to claim 1 in which said locking means includes:

a curved rack following the curve of the central portion of said track member and secured to the track member for movement therewith; and finger means pivotally mounted on said base frame for movement into and out of engagement with said rack at different points along the rack to thereby effect locking and unlocking of the track member relative to the base frame.

3. A helicopter according to claim 2 including intercoupling means between said finger means and the pitch control of the rotor blades of the helicopter whereby when the pitch is adjusted to a given value, the finger means are moved out of the rack to automatically release the track member.

4. A helicopter according to claim 2 including hydraulic control means responsive to a given weight applied to said skids to actuate said locking means whereby said locking means is automatically actuated to hold said helicopter level when the weight of the helicopter on the skids exceeds said given weight upon landing, said locking means being released when the weight of the helicopter is removed from the skids upon take-off.

5. A helicopter according to claim 4 in which said curved track member is semicircular in shape so that the weight of the helicopter when level is evenly divided on each skid regardless of the relative level of one skid to the other.

6. A helicopter according to claim 4, in which said locking means includes first and second curved racks secured to and following the curve of the central portions of said first and second track members respectively; and first and second pairs of finger means pivotally mounted on the base frame in first and second positions to move into and out of engagement, respectively, with said first and second racks at different points along the racks depending upon the positions of the track members in the guide means to thereby effect locking and unlocking of both track members simultaneously relative to the base frame.

7. A helicopter self-leveling landing gear comprising, in combination:

a. a helicopter;

b. a base frame secured to the lower body portion of said helicopter;

c. first and second guide means on the forward and rear portions of said base frame as measured along the longitudinal axis of said helicopter;

d. first and second curved track members of inverted U-shape having central portions passing through said first and second guide means respectively, the opposite lower end portions of each member curving downwardly from the central portion towards the ground, the track members lying in parallel planes normal to the longitudinal axis of said helicopter, said track members being movable together through the guide means to thereby vary the distance between their opposite ends and the ground;

e. landing skids extending generally parallel to the longitudinal axis of the helicopter and secured respectively to the ends of the first and second track members; and, f. locking means on the base frame coupled to the central portions of said first and second track members for locking the track members to the base frame in an immovable position when the locking means is actuated to a first position and releasing the track members for movement through the guide means when the locking means is actuated to a second position whereby the level of one landing skid relative to the other may be varied by movement of the first and second track members through the guide means such that said base frame and helicopter may be maintained at a level position when said landing skids engage uneven terrain during landing, actuation of the locking means to its first position after landing locking the skids in their relative positions on the terrain to maintain the base frame and helicopter level.

8. A helicopter according to claim 7, in which the curved tracks are semicircular in shape so that the weight of the helicopter when level is evenly divided on each skid regardless of the relative level of one skid to the other.

9. A helicopter according to claim 7 including hydraulic control means responsive to a given weight applied to said skids to actuate said locking means whereby said locking means is automatically actuated to hold said helicopter level when the weight of the helicopter on the skids exceeds said given weight upon landing, said locking means being released when the weight of the helicopter is removed from the skids upon take-off.

10. A helicopter according to claim 9 in which said hydraulic control means is disposed between the ends of the curved tracks and the skids.

* * * * *